United States Patent [19]
Keijzer et al.

[11] 3,954,256
[45] May 4, 1976

[54] SUSPENSION SYSTEM FOR AUTOMOTIVE VEHICLES AND THE LIKE

[75] Inventors: Johan H. Keijzer, Hasselt; Louis J. Jossa, Sint-Truiden; Henri C. J. Vanhove, Gelmen; Gilbert M. E. J. Van de Voorde, Sint-Truiden, all of Belgium

[73] Assignee: Monroe Belgium N. V., Sint-Truiden, Belgium

[22] Filed: Aug. 30, 1974

[21] Appl. No.: 502,032

[52] U.S. Cl. ............................................. 267/64 R
[51] Int. Cl.² ........................................... F16F 5/00
[58] Field of Search .............. 267/64 R, 64 A, 65 R, 267/DIG. 1

[56] References Cited
UNITED STATES PATENTS

| | | | |
|---|---|---|---|
| 3,363,893 | 1/1968 | Goddard | 267/64 R |
| 3,527,451 | 9/1970 | Long, Jr. | 267/64 R |
| 3,547,465 | 12/1970 | Hoffman et al. | 267/64 R |

Primary Examiner—James B. Marbert
Attorney, Agent, or Firm—Harness, Dickey & Pierce

[57] ABSTRACT

A vehicle leveling system for varying the attitude between the sprung and unsprung portions of a vehicle and including at least one leveling strut comprising an elongated tubular pressure cylinder, a valved piston reciprocally disposed within the cylinder and connected to a piston rod extending axially from one end of the cylinder, a rod guide and seal assembly disposed within one end of the cylinder for guiding the piston rod for reciprocal movement, a floating piston disposed within the cylinder between the piston and the end of the cylinder opposite that from which the piston rod extends, a quantity of super-atmospheric gas located within the cylinder between the floating piston and the adjacent end of the cylinder, a quantity of damping fluid located within the cylinder on the opposite side of the floating piston and cooperable with the valved piston to damp reciprocal movement of the piston rod, a resilient tubular diaphragm element defining a variable volume chamber surrounding the pressure cylinder, and means for selectively communicating a source of compressed gas to and from the chamber to effect expansion and contraction thereof.

9 Claims, 3 Drawing Figures

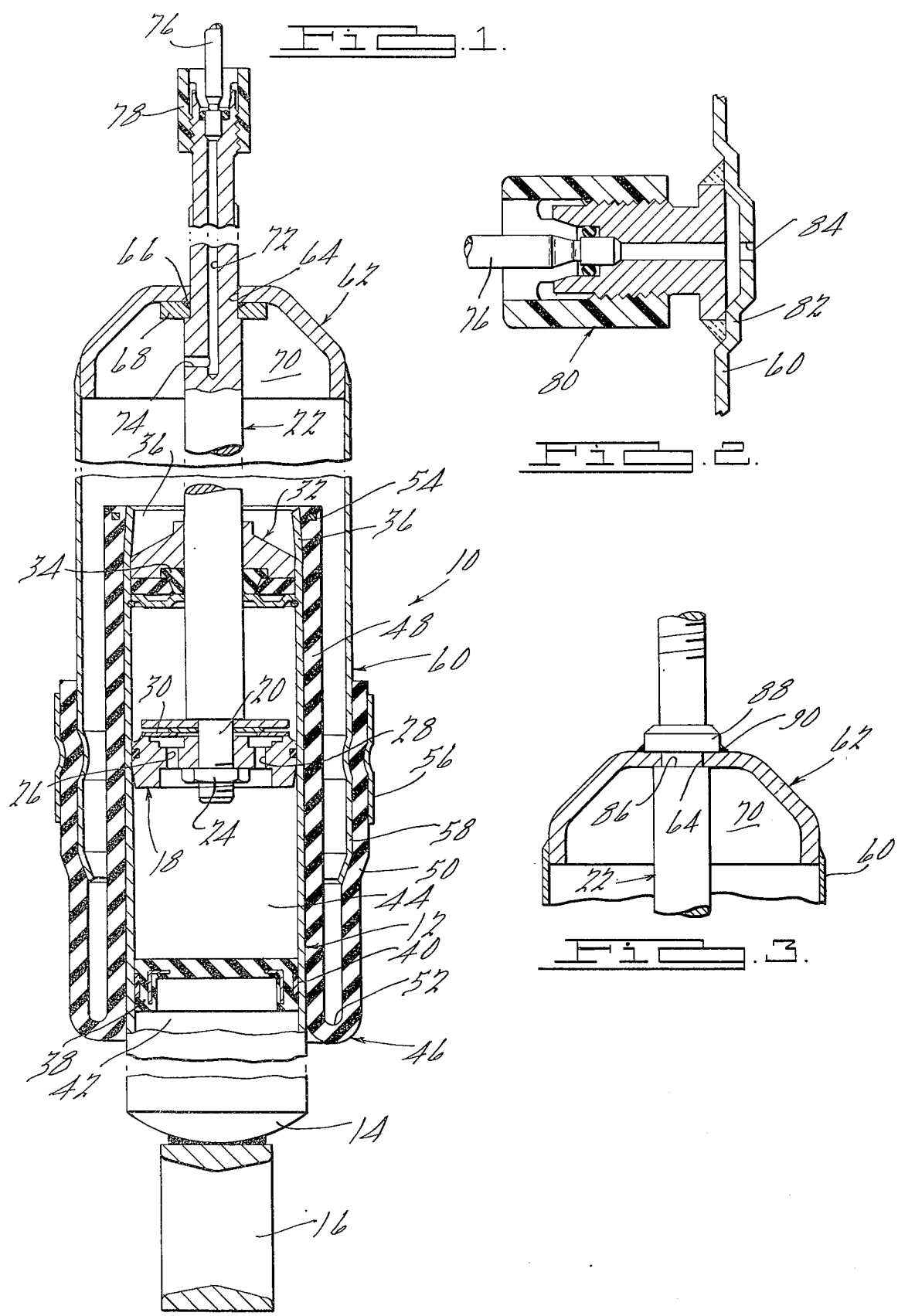

SUSPENSION SYSTEM FOR AUTOMOTIVE VEHICLES AND THE LIKE

SUMMARY OF THE INVENTION

The present invention relates generally to vehicle suspensions and more particularly, to a new and improved suspension strut of the type which is intended to be used with a source of compressed gas, such as compressed air, as supplied from an air compressor, on an automotive vehicle.

Vehicle leveling struts have been well known for many years, although such devices heretofore known and used have been objectionable from the standpoint that they required significant amounts of space when mounted within the vehicle. Typically, such prior known leveling or suspension struts incorporated shock absorbers of the multiple tube type, wherein a fluid reservoir was provided around the outer periphery of the pressure cylinder, with some type of a rolling diaphragm being provided exteriorly of the reservoir. This, of course, resulted in a unit which is extremely large in diameter and hence created installation problems due to the potential interference thereof with the associated chassis and suspension components.

The present invention is directed toward a new and improved suspension strut which is similar to the afore-described type, but which utilizes a pressurized type shock absorber in combination with a variable volume compressed gas chamber. Pressurized shock absorbers, as is known by those skilled in the art, eliminate the need of providing a fluid reservoir exteriorly of the pressure cylinder and hence permit the diameter of the overall suspension strut to be reduced considerably from prior known devices. Additionally, pressurized shock absorbers exhibit certain desired performance characteristics not available with multiple tube shock absorbers and hence the suspension unit of the present invention will be found to provide superior performance characteristics, as well as minimize interference problems upon installation thereof within various types of automotive vehicles.

It is accordingly a general object of the present invention to provide a new and improved suspension strut for a vehicular suspension system.

It is a more particular object of the present invention to provide a new and improved suspension strut which incorporates a pressure-type shock absorber therein.

It is another object of the present invention to provide a new and improved suspension strut which exhibits superior operating characteristics as compared with similar type devices heretofore known and used.

It is still another object of the present invention to provide a new and improved suspension strut which is extremely compact in design and hence minimizes to the extreme the possibility of interference with associated chassis and/or suspension components once installed on a vehicle.

It is still another object of the present invention to provide a new and improved suspension strut which may be provided with various types of communicating means for supplying pressurized gas thereto, thereby providing for universality of installation.

It is still another object of the present invention to provide a new and improved leveling strut which is of relatively simple design and hence will have a long and effective operational life.

Other objects and advantages of the present invention will become apparent from the following detailed description taken in conjunction with the accompanying drawing.

BRIEF DESCRIPTION OF THE DRAWING

FIG. 1 is a longitudinal cross-sectional view of a suspension strut in accordance with the principles of the present invention;

FIG. 2 is an enlarged fragmentary cross-sectional view of an alternate embodiment of the present invention; and FIG. 3 is a longitudinal cross-sectional view of yet another embodiment of the present invention.

DETAILED DESCRIPTION OF THE PREFERRED EMBODIMENTS

Referring now in detail to the drawing and in particular to FIG. 1 thereof, a suspension strut 10, in accordance with one preferred embodiment of the present invention, is shown as comprising an elongated tubular pressure cylinder 12 which is closed at the lower end thereof by a generally cup-shaped end cap 14. Means in the form of a lower attachment ring or fitting 16 is fixedly secured to the end cap 14 and is adapted to function in securing the strut 10 to an unsprung portion, for example, of the associated suspension of an automotive vehicle or the like.

Disposed within the pressure cylinder 12 is a reciprocally disposed piston assembly, generally designated by the numeral 18, which is secured to a reduced diameter end portion 20 of an elongated relatively small diameter piston rod 22. As shown, the piston rod 22 extends longitudinally outwardly or upwardly from the pressure cylinder 12 and is adapted to be secured by suitable attachment means (not shown) to the sprung portion of the associated vehicle. Means in the form of a suitable threaded nut or the like 24 is received upon the end portion 20 of the piston rod 22 for securing the piston assembly 18 thereon. The piston assembly is provided with conventional valve ports 26, 28 and disc-shaped valve means or the like 30 for controlling the flow of hydraulic fluid between the opposite sides of the piston assembly 18 upon reciprocal movement thereof within the pressure cylinder 12 in a manner well known in the art.

Disposed adjacent the upper end of the pressure cylinder 12 is a rod guide and seal assembly, generally designated by the numeral 32, which is provided with a suitable fluid sealing means 34 adapted for sliding sealing engagement with the outer periphery of the upper end of the piston rod 22. As illustrated, the upper end portion 36 of the pressure cylinder 12 extends axially beyond the rod guide assembly 32 and is tapered slightly radially inwardly, as best seen in FIG. 1.

Disposed within the lower end of the pressure cylinder 12 is a floating piston 38 which is provided with a peripheral sealing element 40 adapted for sliding sealing engagement with the inner periphery of the pressure cylinder 12. The floating piston 38 defines the upper boundary of a gas chamber 42 located within the lower end of the pressure cylinder 12, which chamber 42 is charged with a super-atmospheric gas, such as nitrogen. The floating piston 38 serves as a separating means between the gas chamber 42 and a volume of hydraulic fluid which is located above the piston 38 in FIG. 1 within a fluid chamber 44, which hydraulic fluid cooperates with the afore-mentioned piston assembly 18 in damping reciprocal movement of the piston rod 22 relative to the pressure cylinder 12. The pressure of the gas within the chamber 42 is selected such that it is always in excess of atmospheric pressure, whereby the suspension strut 10 can be categorized as embodying a "pressurized" shock absorber unit, as distinguished from a non-pressurized type unit wherein a hydraulic reservoir is traditionally provided into which hydraulic fluid may flow to accommodate for inward movement of the piston rod during a compression stroke.

Disposed exteriorly of the pressure cylinder 12 is a rolling diaphragm element, generally designated by the numeral 46, which comprises a radially inner end portion 48 and a radially outer end portion 50 connected by an integral reverse fold portion 52. The upper end of the inner end portion 48 is fixedly secured by means of a suitable embedded band or the like 54 adjacent the inwardly tapered upper end portion 36 of the pressure cylinder 12. The inner end portion 48 of the diaphragm 46 extends axially downwardly around and is in continuous engagement with the outer periphery of the pressure cylinder 12 down to the reverse bend portion 52, with the outer end portion 50 being fixedly secured by means of a suitable clamping ring or the like 56 to the lower end portion 58 of a generally tubular dirt shield member 60 which extends concentrically around the outer periphery of the pressure cylinder 12. The upper end of the dirt shield 60 is secured by welding or the like to a generally cup-shaped member 62 which is formed with a central axially extending bore 64 through which the upper end of the piston rod 22 extends. An O-ring sealing element 66 is retained in sealing engagement with the outer periphery of the piston rod 22 by means of a retaining ring 68 which is fixedly secured to the underside of the cup-shaped member 62, whereby to provide a fluid-tight joint between the exterior of the suspension strut 10 and a variable volume chamber 70 defined by the dirt shield 60 and diaphragm 56.

The variable volume chamber 70 is adapted to be selectively supplied with a pressurized fluid, such as compressed air, for example, by means of an elongated bore formed within the interior of the upper end of the piston rod 22, the lower end of the bore 72 being communicable with a cross bore 74 which connects directly with the chamber 70. The upper end of the bore 72 is adapted to be communicable with a suitable conduit 76 which is fixedly secured to the piston rod 22 by means of a fitting assembly, generally designated by the numeral 78. As will be appreciated by those skilled in the art, at such time as compressed air or the like is supplied from the conduit 76 to the chamber 70, for example, to accommodate for increased loading of the associated vehicle, the chamber 70 will increase in volume and conversely, at such time as the pressure of the gas within the chamber 70 is reduced, the volume thereof will be reduced accordingly. Thus, an increase or a decrease in the pressure of the gas supplied to the chamber 70 will effect either expansion or contraction of the suspension strut 10 in a manner well known in the art.

It is contemplated that for certain types of installations, it may be desirable to connect the gas conduit 76 with the chamber 70 in some manner other than through the piston rod 22. One such connection is shown in FIG. 2 wherein a fitting assembly, generally designated by the numeral 80, is fixedly secured to a depressed portion or area 82 formed directly on the dirt shield 60. A suitable flow port or the like 84 is formed in the depressed area 82 for communicating pressurized gas that is supplied to the fitting assembly 80 from the conduit 76 into the chamber 70. It will be appreciated, of course, that various other types of connections could be used and that the connection or fitting assembly 80 is only one of a wide variety of different types of means for communicating pressurized gas from the conduit 76 to the variable volume chamber 70.

It is also contemplated that it may be desirable to attach the cup-shaped member 62 defining the upper end of the variable volume chamber 70 in some manner other than that shown in FIG. 1. Such an alternate construction is shown in FIG. 3 wherein the piston rod 22 is formed with an annular shoulder 86 which is adapted to bear against the underside of the member 62 directly outwardly from the bore 64 formed therein. Means in the form of a suitable retaining ring or the like 88 may be fixedly secured, as by welding, to the upper side of the member 62 to secure the member 62 to the rod 22.

It will be seen that the present invention provides a novel suspension strut which not only incorporates the well known features of air adjustable shock absorbers, but additionally, incorporates the many advantages heretofore known in connection with pressurized shock absorbers; thus, a novel combination is provided for assuring desirable ride characteristics of the associated vehicle together with the many advantages of an air adjustable unit which may be used to accommodate for varying vehicle loading.

While it will be apparent that the preferred embodiments herein illustrated are well calculated to fulfill the objects stated, it will be appreciated that the present invention is susceptible to modification, variation and change without departing from the proper scope or fair meaning of subjoined claims.

We claim:
1. In a leveling system for varying the attitude between the sprung and unsprung portions of a vehicle,
a leveling strut comprising a pressurized shock absorber having an elongated tubular pressure cylinder,
a valved piston reciprocally disposed within said cylinder and connected to a piston rod extending axially from one end of said cylinder,
a rod guide and seal assembly disposed with said one end of said cylinder for guiding said piston rod for reciprocable movement relative to said cylinder,
said one end of said cylinder being at least partially deformed radially inwardly to retain said rod guide and seal assembly in its operative position within said cylinder,
a floating piston disposed with said cylinder between said valved piston and the end of said cylinder opposite that from which said piston rod extends,
a quantity of pressurized gas located within said cylinder between said floating piston and said opposite cylinder end,
a quantity of damping fluid located within said cylinder on the opposite side of said floating piston from said gas and cooperable with said valved piston to damp said reciprocable movement of said piston rod relative to said cylinder,
first attachment means for securing the axially outwardly extending end of said piston rod to one of said vehicle portions and second attachment means for securing said opposite end of said cylinder to the other of said vehicle portions, means including a resilient tubular diaphragm element defining a variable volume chamber at least partially surrounding said pressure cylinder, said element including first and second end portions connected by an integral reversely folded portion, said first end of said element being sleeved over said deformed one end of said cylinder and being contiguously engaged with the outer surface of said cylinder and having the terminus end portion thereof fixedly secured to said cylinder directly radially adjacent said deformed one end thereof, a dirt shield arranged concentrically of said pressure cylinder, one end of said dirt shield being connected to said piston rod, said second end portion of said element being spaced radially outwardly from said first end portion thereof and connected to the radially outer side of said dirt shield, and means for selectively communicating a source of pressurized gas to and from said chamber to effect expansion and contraction of said chamber.

2. The invention as set forth in claim 1 which includes a generally cup-shaped member fixedly secured to one end of said dirt shield and connected to said piston rod.

3. The invention as set forth in claim 2 which includes a gas fitting fixedly secured to said dirt shield and operable to communicate a gas conduit with said variable volume chamber.

4. The invention as set forth in claim 2 wherein said cup-shaped member is secured as by welding to said piston rod.

5. The invention as set forth in claim 2 which includes O-ring sealing means adjacent said cup-shaped member for providing a fluid-tight seal between said cup-shaped member and said piston rod.

6. The invention as set forth in claim 1 which includes fluid passage means in said piston rod connecting said variable volume chamber with said source of pressurized gas.

7. The invention as set forth in claim 1 wherein said superatmospheric gas comprises pressurized nitrogen.

8. The invention as set forth in claim 1 wherein one end of said pressure cylinder extends axially beyond said rod guide and seal assembly, and wherein said first end portion of said element is fixedly secured to said extending end portion of said pressure cylinder.

9. The invention as set forth in claim 2 wherein said dirt shield is of a generally cylindrical configuration and extends a substantial length coaxially around said pressure cylinder, and wherein said first end portion of said diaphragm element is disposed interiorly of said dirt shield and wherein said second end portion of said diaphragm element is disposed exteriorly of said dirt shield.

* * * * *